United States Patent
Oyanagi et al.

(10) Patent No.: US 9,018,274 B2
(45) Date of Patent: Apr. 28, 2015

(54) INK COMPOSITION

(75) Inventors: Takashi Oyanagi, Nagano (JP); Keitaro Nakano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 13/289,763

(22) Filed: Nov. 4, 2011

(65) Prior Publication Data

US 2012/0069108 A1    Mar. 22, 2012

Related U.S. Application Data

(63) Continuation of application No. 11/311,698, filed on Dec. 19, 2005.

(30) Foreign Application Priority Data

| Dec. 21, 2004 | (JP) | P.2004-370204 |
| Dec. 27, 2004 | (JP) | P.2004-376503 |
| Mar. 29, 2005 | (JP) | P.2005-094830 |
| Nov. 24, 2005 | (JP) | P.2005-339142 |
| Nov. 24, 2005 | (JP) | P.2005-339143 |

(51) Int. Cl.
C08B 37/00    (2006.01)
C09D 11/101   (2014.01)

(52) U.S. Cl.
CPC ................... C09D 11/101 (2013.01)

(58) Field of Classification Search
CPC ............................................. C08F 2/50
USPC ........................................... 522/7
See application file for complete search history.

(56) References Cited

U.S. PATENT DOCUMENTS

| 4,992,351 A * | 2/1991 | Ohkuma et al. ............ 430/138 |
| 5,623,001 A | 4/1997 | Figov |
| 5,910,390 A * | 6/1999 | Hatanaka et al. ............ 430/139 |
| 6,080,450 A * | 6/2000 | Cantor ...................... 427/517 |
| 6,110,987 A | 8/2000 | Kamata et al. |
| 6,376,576 B2 | 4/2002 | Kang et al. |
| 6,467,897 B1 | 10/2002 | Wu et al. |
| 6,607,794 B1 | 8/2003 | Wilson et al. |
| 6,913,352 B2 | 7/2005 | Yoshihiro et al. |
| 2002/0026049 A1 | 2/2002 | Wolf et al. |
| 2002/0086914 A1 | 7/2002 | Lee et al. |
| 2002/0149659 A1 | 10/2002 | Wu et al. |
| 2003/0222961 A1 | 12/2003 | Nakajima |
| 2004/0254293 A1 | 12/2004 | Killilea et al. |
| 2006/0160917 A1 | 7/2006 | Oyanagi et al. |
| 2009/0104373 A1 * | 4/2009 | VanBesien et al. ........... 427/553 |
| 2012/0029108 A1 * | 2/2012 | Nakane et al. .................. 522/26 |
| 2012/0069108 A1 | 3/2012 | Oyanagi et al. |

FOREIGN PATENT DOCUMENTS

| CN | 1486353 A | 3/2004 |
| JP | 04-018453 A | 1/1992 |
| JP | 07-068920 A | 3/1995 |
| JP | 10-287035 A | 10/1998 |
| JP | 11-508637 A | 7/1999 |
| JP | 2001-115067 A | 4/2001 |
| JP | 2001-247804 A | 9/2001 |
| JP | 2002-241647 A | 8/2002 |
| JP | 2003-221529 A | 8/2003 |
| JP | 2003-326691 A | 11/2003 |
| JP | 2004-002616 A | 1/2004 |
| JP | 2004-099649 A | 4/2004 |
| JP | 2004-516963 A | 6/2004 |
| JP | 3564846 B2 | 6/2004 |
| JP | 2004-277691 A | 10/2004 |
| JP | 2006-274025 A | 10/2006 |
| WO | 97/31051 A1 | 8/1997 |
| WO | 02/053659 A2 | 7/2002 |

OTHER PUBLICATIONS

Fusion UV Systems, Inc., Technical Report, Aug. 2001, p. 3.

* cited by examiner

*Primary Examiner* — Megan McCulley

(57) ABSTRACT

The present invention provides an ink composition comprising at least a polymerizable compound, a photo-polymerization initiator and a polymerization accelerator, wherein the polymerizable compound comprises en N-vinyl compound, the photo-polymerization initiator comprises two or more compounds selected from the group consisting of bisacylphosphine oxides, monoacylphosphine oxides and α-amino ketones, and the polymerization accelerator comprises fine particles having a polymerizable functional group. The ink composition of the invention may be a transparent ink composition containing no coloring material. The ink composition of the invention may further contain a fluorescent whitening agent.

3 Claims, No Drawings

INK COMPOSITION

This is a continuation of copending application Ser. No. 11/311,698 filed on Dec. 19, 2005, which claims the benefit thereof and incorporates the same by reference.

FIELD OF THE INVENTION

The present invention relates to an ink composition. More specifically, it relates to an ink composition which cures with an ultraviolet ray and which is free from a curing defect due to the influence of scattering and absorption of the ultraviolet ray by a coloring material component. Particularly, the invention relates to an ink composition suitable for irradiation and curing with an ultraviolet ray using an ultraviolet LED having a light-emission peak of a very narrow width in the wavelength direction.

BACKGROUND OF THE INVENTION

An inkjet recording method is a printing method wherein printing is performed by ejecting small droplets of an ink composition and attaching them to a recording medium such as paper. The inkjet recording method has characteristics that images having a high resolution and a high quality can be printed in a high speed. The ink composition for use in the inkjet recording method generally contains an aqueous solvent as a main component and further a coloring component and a wetting agent such as glycerin for the purpose of preventing clogging.

On the other hand, in the case where printing is performed on printing media such as some kinds of paper and fabric into which an aqueous ink composition is difficult to permeate or plates and films made of raw materials such as metals or plastics, e.g., phenol, melamine, vinyl chloride, acryl, polycarbonate and the like resins, it is required for an ink composition or a reaction liquid to contain a component which enables a coloring material to be fixed onto the recording media stably. In particular, recently, the recording method has been used for plastic cards, color filters, print-circuit boards, and the like.

For such a requirement, there have been disclosed an ultraviolet-curable inkjet ink containing a coloring material, an ultraviolet curing agent (polymerizable compound), a (photo-)polymerization, initiator, and the like (see, e.g., Patent Document 1). It is described that according to the ink, blurring of the ink on recording media can be prevented and image quality can be improved.

Such an ultraviolet-curable ink is for a process in which the ink is attached onto a recording medium and the resulting medium is then irradiated with an ultraviolet ray to cure the ink. Heretofore, as a means for curing such ultraviolet-curable ink, there has been used a low-pressure, high-pressure, or ultrahigh-pressure mercury lamp, a xenon lamp, a metal halide lamp, or the like.

Further, there is a case that an ultraviolet-curable ink contains a coloring material such as pigment. Coloring materials such as pigments have strong scattering/absorption also in an ultraviolet region in many cases and hence the irradiated ultraviolet ray is not effectively utilized, so that ultraviolet-curable inks containing coloring materials are apt to cause a curing defect.

In conventional art, in order to prevent the curing defect of the ultraviolet-curable ink as described above, there exist methods wherein irradiation of a large excess of ultraviolet ray is carried out by means of a mercury lamp or the like, or curing with an ultraviolet ray and heat treatment are used in combination. However, these methods are not preferred because of high facility costs and also there are problems that irradiation by a mercury lamp requires a cooling device and the life of the light source is short, so that the methods are not easy to use. Further, in these methods, since heat is applied to the recording media, there is also a problem that usable recording media are limited.

Recently, with the development of semiconductor light-emitting devices capable of emitting only an ultraviolet light having a specific wavelength range at a high intensity and requiring a small power consumption, such as ultraviolet light-emitting diodes (ultraviolet LED), adoption of these semiconductor light-emitting devices as light source enables elimination of impartment of heat damage to the recording media induced by the combined use of heat treatment as well as energy saving and miniaturization and weight saving of the facilities (see, e.g., Patent Document 2).

Patent Document 1: U.S. Pat. No. 5,623,001
Patent Document 2: JP-A-2003-326591

However, unlike the ultraviolet light emission consisting of a conventional continuous spectrum emitted by a high-pressure mercury lamp, a xenon lamp or the like, light emission induced by an LSD is a single peak and a spread of the peak width in the wavelength direction is very small (±5 to 10 μm as half-band width). Therefore, it is still very difficult to cure the ink in the case where a reflection/absorption peak of a coloring material such as a pigment to be used overlaps with an ultraviolet peak to be irradiated.

SUMMARY OF THE INVENTION

The invention is to overcome the foregoing defects in the background art.

Accordingly, an object of the invention is to provide an ink composition which is suitable for ultraviolet irradiation/curing using an ultraviolet LED having a light-emission peak of a very narrow width in the wavelength direction, and is free from a curing defect due to the influence of scattering and absorption of the ultraviolet ray by a coloring material.

As a result of expensive studies, the present inventors have accomplished the present invention with achieving the above object by adopting the following constitutions.

Namely, the present invention is as follows.

(1) An ink composition comprising at least a polymerizable compound, a photo-polymerization initiator, and a polymerization accelerator, wherein the polymerizable compound comprises an N-vinyl compound, the photo-polymerization initiator comprises two or more compounds selected from the group consisting of bisacylphosphine oxides, monoacylphosphine oxides and α-amino ketones, and the polymerization accelerator comprises fine particles having a polymerizable functional group.

(2) The ink composition according to the above (1), wherein the N-vinyl compound is N-vinylformamide.

(3) The ink composition according to the above (1), wherein the fine particles are silica fine particles having a polymerizable functional group introduced onto their surfaces.

(4) The ink composition according to the above (3), wherein the introduction of the polymerizable functional group onto the surfaces of the silica fine particles is carried out by means of a silane coupling agent.

(5) The ink composition according to any one of the above (1) to (4), wherein the polymerizable functional group is an acryl group or a methacryl group.

(6) The ink composition according to the above (1), wherein the polymerization accelerator further comprises an aminobenzoate derivative.

The ink composition of the invention contains an N-vinyl compound as the polymerizable compound, fine particles having a polymerizable functional group as the polymerization accelerator (hereinafter, also referred to simply as "polymerizable fine particles"), and two or more compounds selected from bisacylphosphine oxides, monoacylphosphine oxides and α-amino ketones as the photo-polymerization initiators.

The bisacylphosphine oxides, monoacylphosphine oxides and α-amino ketones are all photo-polymerization initiators which absorb a light having a wavelength of 365 nm or longer and generate radicals to initiate polymerization of the polymerizable compound.

The ink composition of the invention uses, as photo-polymerization initiators, two or more compounds which absorb a light having a wavelength of 365 nm or longer and generate radicals to initiate polymerization of the polymerizable compound. Therefore, even when the ink compound contains a coloring material such as a pigment, an ultraviolet LED having a light emission peak of a very narrow width in the wavelength direction is used, and a scattering/reflection/absorption peak of the coloring material partially overlaps with a peak of an ultraviolet ray to be irradiated, a photo-polymerization initiator having an absorption peak different from the scattering/reflection/absorption peak of the coloring material may act and hence a curing defect can be avoided.

For example, in the case of a yellow ink, PY 74 (Pigment Yellow 74) contained has ultraviolet absorption at 250 nm or shorter and at 400 nm or longer. With such a yellow ink, a sufficient curing can be achieved by the use of a photo-polymerization initiator which absorbs a light having a wavelength of 365 nm or longer as in the invention.

Further, in the case of a magenta ink, PR 122 (Pigment Red 122) contained has ultraviolet absorption at 350 nm or shorter. With such a magenta ink, a sufficient curing can be achieved by the use of a photo-polymerization initiator which absorbs a light having a wavelength of 365 nm or longer as in the invention.

In the case of a cyan ink, PB 15:3 (Pigment Blue 15:3) contained has ultraviolet absorption at 300 to 400 nm. With such a cyan ink, a sufficient curing can be achieved by the use of a photo-polymerization initiator which absorbs a light having a wavelength of 365 nm or longer, i.e., suitable for an ultraviolet light of 395 nm or longer which is more highly transmitted.

In the case of a black ink, carbon black contained has absorption over the whole range of ultraviolet and visible light. Also with such a black ink, a sufficient curing can be achieved by the use of a photo-polymerization initiator which absorbs a light having a wavelength of 365 nm or longer, i.e., suitable for an ultraviolet light of 395 nm or longer which is more highly transmitted.

In the case of a white ink, titanium dioxide contained has scattering/reflection spectrum over the whole range of an ultraviolet light. Also with such a white ink, a sufficient curing can be achieved by the use of a photo-polymerization initiator which scatters/reflects a light having a wavelength of 365 nm or longer, i.e., suitable for an ultraviolet light of 395 nm or longer which has a longer wavelength and is more highly transmitted and close to visible light.

Further, the ink composition of the invention prevents a surface curing defect and an inside curing defect by the use of polymerizable fine particles as a polymerization accelerator, whereby good printing results can be obtained.

DETAILED DESCRIPTION OF THE INVENTION

The ink composition of the invention is described in detail below.

The ink composition of the invention is an ink composition comprising at least a polymerizable compound, a photo-polymerization initiator, and a polymerization accelerator, which contains an N-vinyl compound as the polymerizable compound and two or more compounds selected from bisacylphosphine oxides, monoacylphosphine oxides and α-amino ketones as the photo-polymerization initiators.

The bisacylphosphine oxides, monoacylphosphine oxides and α-amino ketones for use in the ink composition of the invention are those which absorb a light having a wavelength of 365 nm or longer. In particular, the bisacylphosphine oxides and monoacylphosphine oxides has absorption at a wavelength range longer than the wavelength range of the α-amino ketones.

The bisacylphosphine oxide includes bis(2,4,6-trimethylbenzoyl)phenylphosphine oxide and the like, which is available, for example, as a trade name of Irgacure 819 (manufactured by Ciba Specialty Chemicals).

The monoacylphosphine oxide includes 2,4,6-trimethylbenzoyl-diphenyl-phosphine oxide and the like, which is available, for example, as a trade name of Darocur TPO (manufactured by Ciba Specialty Chemicals).

The α-amino ketone includes 2-benzyl-2-dimethylamino-1-(4-morpholinophenyl)-butanone-1 and the like, which is available, for example, as a trade name of Irgacure 369 (manufactured by Ciba Specialty Chemicals).

In the ink composition of the invention, as far as it contains at least two or more of the above compounds as photo-polymerization initiators, other photo-polymerization initiators may be used in combination.

Representative examples of the other photo-polymerization initiator which may be used in combination include benzoin methyl ether, benzoin ethyl ether, isopropyl benzoin ether, isobutyl benzoin ether, 1-phenyl-1,2-propanedione-2-(o-ethoxycarbonyl)oxime, benzil, diethoxyacetophenone, benzophenone, chlorothioxanthone, 2-chlorothioxanthone, isopropylthioxanthone, diethylthioxanthone, 2-methylthioxanthone, polychlorinated polyphenyl, hexachlorobenzene, and the like. Preferred are isobutyl benzoin ether and 1-phenyl-1,2-propanedione-2-(o-ethoxycarbonyl)oxime.

Further, photo-polymerization initiators available as trade names of Vicure 10, 30 (manufactured by Stauffer Chemical), Irgacure 127, 184, 500, 651, 2959, 907, 379, 754, 1700, 1800, 1850, OXE01, Darocure 1173, ITX (manufactured by Ciba Specialty Chemicals), Quantacure CTX, ITX (manufactured by Aceto Chemical), Kayacure DETX-S (manufactured by Nippon Kayaku Co., Ltd.), and ESACURE KIP150 (manufactured by Lambert), Lucirin TPO (manufactured by BASF) can also be used.

As the polymerizable compound contained in the ink composition of the invention, it is sufficient that the composition contains at least an N-vinyl compound.

The N-vinyl compound includes N-vinylformamide, N-vinylcarbazol, N-vinylacetamide, N-vinylpyrrolidone, N-vinylcaprolactam, and derivatives thereof.

Further, the ink composition of the invention may contain other polymerizable compounds than the N-vinyl compound as the polymerizable compound.

The other polymerizable compound is not particularly limited as far as it is polymerized by radicals or ions formed from the photo-polymerization initiator. Such a polymerizable compound means a molecule which can be a constitutional unit of a basic structure of a polymer. Such a polymerizable compound is also referred to as a photo-polymerizable monomer and includes a monofunctional monomer, a bifunctional monomer, and a polyfunctional monomer. In this connection, the monofunctional monomer, bifunctional monomer and polyfunctional monomer are not particularly limited but those having a molecular weight of about 100 to 3,000, preferably about 100 to 2,000 can be employed.

As representatives of such a polymerizable compound, the monofunctional monomer includes (2-methyl-2-ethyl-1,3-dioxolan-4-yl)methyl acrylate, (2-methyl-2-isobutyl-1,3-dioxolan-4-yl)methyl acrylate, phenoxyethyl acrylate, isobornyl acrylate, methoxydiethylene glycol monoacrylate, acryloylmorpholine, lauryl methacrylate, allyl glycol, 2-hydroxyethyl methacrylate, cyclohexyl methacrylate, and oxetane methacrylate.

The bifunctional monomer includes ethylene glycol dimethacrylate, diethylene glycol diacrylate, diethylene glycol dimethacrylate, tripropylene glycol diacrylate, 1,9-nonanediol diacrylate, polyethylene glycol #400 diacrylate, tetraethylene glycol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane, hydroxypioperinoic acid ester neopentyl glycol diacrylate, and 1,4-butanediol dimethacrylate.

The polyfunctional monomer includes trimethylolpropane triacrylate, trimethylolpropane trimethacrylate, trimethylolpropane EO-adducted triacrylate, trimethylolpropane PO-adducted triacrylate, glycerin EO-adducted triacrylate, glycerin 10-modified triacrylate, glycerin PO-adducted triacrylate, pentaerythritol triacrylate, dipentaerythritol hexaacrylate, (2,2,2-triacryloyloxymethyl)ethyl hydrogen phthalate, and dipentaerythritol polyacrylate.

Among the above mono functional monomers, bifunctional monomers and polyfunctional monomers for use in combination as the other monomer than the N-vinyl compound, preferred are acryloylmorpholine (a monofunctional monomer), phenoxyethyl acrylate (a monofunctional monomer), tripropylene glycol diacrylate (a bifunctional monomer), (2,2,2-triacryloyloxymethyl)ethyl hydrogen phthalate (a polyfunctional monomer), glycerin EO-modified triacrylate (a polyfunctional monomer), and glycerin EO-adducted triacrylate (a polyfunctional monomer), but the invention is not limited to these combined uses.

As the polymerization accelerator contained in the ink composition of the invention, it is sufficient that the composition contains fine particles having at least a polymerizable functional group.

The polymerization acceleration mechanism of the fine particles onto which a polymerizable functional group is introduced is not clear but is presumed that radicals formed from the photo-polymerization initiator which has absorbed an ultraviolet ray and cleaved are trapped and stabilized on the surface of the fine particles and easily initiate the polymerization of the polymerizable functional group introduced onto the surfaces of the fine particles and the polymerizable compound adsorbed on the surface to thereby accelerate the polymerization reaction.

The fine particles for use in the fine particles having a polymerizable functional group are not particularly limited but are generally those referred to as extenders. Examples thereof include inorganic compounds such as silica, alumina, titania, and calcium oxide. In particular, transparent ones such as silica and alumina can be suitably used and among them, silica is particularly preferred.

Further, the polymerizable functional group contained in the fine particles is not particularly limited and an acryloyl group, a methacryloyl group, or the like may be exemplified. Furthermore, it is also possible to use a polymerizable functional group having one or more double bonds.

The size of the fine particles is not particularly limited but preferred are those having a particle size of 10 to 200 nm.

The process for producing the fine particles having the polymerizable functional group is not particularly limited and there may be mentioned a method comprising preparing silica fine particles having a large number of hydroxyl groups through a sol-gel reaction of a silane compound such as tetraethoxysilane and then reacting them with a compound capable of imparting a polymerizable functional group to the hydroxyl group (a silane coupling agent).

The content of the fine particles having a polymerizable functional group in the ink composition of the invention is nor particularly limited and is suitably selected depending on type of usage, conditions, relation between the viscosity and polymerizability of the ink composition, but it is preferably 10% by weight or less based on the whole amount of the ink composition.

Further, the ink composition of the invention may contain a substance other than the polymerizable fine particles as a polymerization accelerator.

The other polymerization accelerator is not particularly limited but in particular, an aminobenzoate derivative is preferred in view of an odor problem and more secure curing of the ink composition. This is because the aminobenzoate derivative reduces polymerization inhibition induced by oxygen.

The aminobenzoate derivative does not have absorption at a wavelength range of 350 nm or longer. Examples of such an aminobenzoate derivative are not particularly limited but include ethyl 4-dimethylaminobenzoate and 2-ethylhexyl 4-dimethylaminobenzoate, which are available as trade names of Darocur EDB and EHA (manufactured by Ciba Specialty Chemicals).

The ink composition of the invention usually contains a coloring material.

The coloring material contained in the ink composition of the invention may be either of a dye or a pigment. In the case where permeation of a coloring component in the ink composition is to be restrained by the action of insolubilization or thickening of the ink composition, pigments dispersed in the ink are more advantageous than dyes dissolved in the ink. Pigments are more advantageous in view of image durability of printed matters.

As the dye for use in the invention, various dyes usually used in inkjet recording, such as direct dyes, acid dyes, food dyes, basic dyes, reactive dyes, disperse dyes, vat dyes, soluble vat dyes, or reactive disperse dyes can be used.

As the pigment for use in the invention, an inorganic pigment or an organic pigment can be used without particular limitation.

As the inorganic pigment, in addition to titanium oxide and iron oxide, carbon black produced by known processes such as a contact process, a furnace process, and a thermal process can be used. Further, as the organic pigment, there can be used azo pigments including azo lakes, insoluble azo pigments, condensed azo pigments, chelate azo pigments, and the like; polycyclic pigments including phthalocyanine pigments, perylene pigments, perynone pigments, anthraquinone pigments, quinacrydone pigments, dioxazine pigments, thioindigo pigments, isoindolinone pigments, quinofuralone pigments, and the like; dye chelates including basic dye-type chelates, acid dye-type chelates, and the like; nitro pigments, nitroso pigments, aniline black, and the like can be used.

As specific examples of the pigment, carbon black includes No. 2300, No. 900, MCF88, No. 33, No. 40, No, 45, No. 52, MA 7, MA 8, MA 100, No. 2200B, and the like manufactured by Mitsubishi Chemical Corp.; Raven 5750, 3250, 5000, 3500, 1255, 700, and the like manufactured by Columbia; Regal 400R, 330R, 660R, Mogul L and 700, Monarch 800, 880, 900, 1000, 1100, 1300, 1400, and the like manufactured by Cabot; Color Black FW1, FW2, FW2V, FW18, FW200, Color Black S150, S160, and S170, Printex 35, U, V, and 140U, Special Black 6, 5, 4A, and 4, and the like manufactured by Degussa.

The pigment for use in yellow ink includes C. I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and the like.

The pigment for use in magenta ink includes C. I. Pigment Red 5, 7, 12, 48 (Ca), 48 (Mn), 57 (Ca), 57:1, 112, 122, 123, 168, 184, 202, 209, C. I. Pigment Violet 19 and the like.

The pigment for use in cyan ink includes C. I. Pigment Blue 1, 2, 3, 15:3, 15:4, 60, 16, 22, and the like.

The pigment for use in white ink includes titanium dioxide, calcium carbonate, calcium sulfate, zinc oxide, barium sulfate, barium carbonate, silica, alumina, kaolin, clay, talc, white clay, aluminum hydroxide, magnesium carbonate, white hollow resin emulsion, and the like According to a preferred embodiment of the invention, the pigment has an average particle size of preferably about 10 to 500 nm, more preferably about 50 to 300 nm.

The amount of the coloring material to be added in the ink composition is preferably in the range of about 0.1 to 25 wt %, more preferably in the range of about 0.5 to 15 wt %.

According to a preferred embodiment of the invention, these pigments are preferably added to the ink composition in the form of pigment dispersions obtained by dispersing them in aqueous media with a dispersant or a surfactant. As a preferred dispersant, a dispersant conventionally used for preparing a pigment dispersion, for example, a polymer dispersant can be used. In this connection, it is obvious for those skilled in the art that the dispersant and surfactant contained in the pigment dispersion also functions as the dispersant and surfactant for the ink composition.

Specifically, the dispersant and surfactant includes polymer dispersants such as polyacrylic acid, polyacrylic acid-styrene copolymers, polyesters, polyurethanes, polyvinyl chloride, polyvinyl chloride-vinyl acetate copolymers, vinyl chloride-modified polyacrylic acid, polyoxyalkylene-added polyalkyleneamine, and polyvinyl butyral; and silicone-based surfactants such as polyester-modified polydimethylsiloxane and polyether-modified polydimethylsiloxane, acetylene diol-based surfactants, sorbitan-based surfactants, and the like.

The ink composition of the invention may contain an aqueous solvent. Further, as optional components, a resin emulsion, an inorganic oxide colloid, a wetting agent, a pH regulator, an antiseptic, a fungicide, and the like may be added.

Further, it is preferred that the ink composition of the invention does not contain any organic solvent and is a non-solvent type ink composition.

The ink composition of the invention is illustrated above with reference to embodiments containing a coloring material. However, the ink composition of the invention may be a "transparent ink composition" containing no coloring material. The transparent ink composition curable with an ultraviolet ray is used, for example, such that it is applied onto images printed with ink compositions containing coloring materials to form a protective film for the printed images.

By designing the ink composition of the invention in the form of transparent ink composition, there is provided an ultraviolet-curable transparent ink composition which is easy to distinguish between before and after curing.

The transparent ink composition of the invention snows a blue color before curing and the color disappears after curing by containing an N-vinyl compound as a polymerizable compound and fine particles having a polymerizable functional group as a polymerization accelerator.

This action mechanism is not clear but it is considered that the blue color is developed by some interaction between the N-vinyl compound as the polymerizable compound and the fine particles having a polymerizable functional group as a polymerization accelerator before curing and the interaction disappears after curing, whereby the color disappears.

In terms of a photochromism technology, compounds and compound systems which absorb an ultraviolet ray to develop or change color have been well investigated and disclosed, but there is no knowledge concerning compounds or compound systems which lose color upon absorption of the ultraviolet ray. In particular, the ultraviolet-curable ink composition of the invention which forms a transparent cured article should be colored before curing but be colorless after curing. However, with regard to addition of a substance which may develop, lose, or change color with an ultraviolet ray, a substance which develops or changes color does not satisfy the requirement that it may become colorless and transparent after ultraviolet irradiation. Also, a substance which loses color has a problem that a product after decomposition remains in the ink composition and the product may be colored with time to impair appearance.

To the contrary, the transparent ink composition of the invention utilizes a phenomenon that a blue color is developed through the interaction between the monomer and the polymerization accelerator, although the color-developing mechanism is not completely elucidated. Unlike the addition of a coloring material or functional material described above, the substances loses color through curing by photo-polymerization thereof, and hence there is no possibility of impairing the appearance, e.g., through bleeding out or coloring by degradation after curing.

According to the transparent ink composition of the invention, since it can be easily distinguished between before and after curing, careless contact to the ink composition before curing with the skin may hardly occur.

The transparent ink composition of the invention is constituted similarly to the above ink composition of the invention except that a coloring material is not contained.

The transparent ink composition, of the invention may contain, as the polymerizable compound, a polymerizable compound other than the N-vinyl compound in such an amount that color development through interaction between the N-vinyl compound and the fine particles having a polymerizable functional group before curing is not inhibited.

Further, the transparent ink composition of the invention may contain, as the polymerization accelerator, a polymerization accelerator other than the polymerizable fine particles in such an amount that color development through interaction between the N-vinyl compound and the polymerizable fine particles before curing is not inhibited.

The present invention also provides a fluorescent whitening agent-containing ink composition comprising at least a polymerizable compound, a photo-polymerization initiator, a polymerization accelerator and a fluorescent whitening agent, wherein the photo-polymerization initiator has an absorption wavelength band that overlaps with a light emission wavelength band of the fluorescent whitening agent.

Since the fluorescent whitening agent is a substance which absorbs a light of ultraviolet region of a wavelength of 200 nm to 400 nm and emits fluorescence of visible region of 400 nm to 600 nm, in the case where it is used in combination with a photo-polymerization initiator which absorbs a light of ultraviolet region of 200 nm to 400 nm, light absorption of the photo-polymerization initiator competes with that of the fluorescent whitening agent, so that a reduction in the curability of the ultraviolet-curable ink cannot be avoided.

To the contrary, since the fluorescent whitening agent-containing ink composition of the invention is constituted so that the absorption wavelength band of the photo-polymerization initiator overlaps with the light-emission wavelength band of the fluorescent whitening agent, an ultraviolet ray is absorbed by the fluorescent whitening agent and also the fluorescence emitted is absorbed by the photo-polymerization initiator and thus can contribute to the curing reaction. Therefore, although both of the photo-polymerization initiator and the fluorescent whitening agent are contained in the ink composition, the curability is not lowered but enhanced.

In the fluorescent whitening agent-containing ink composition of the invention, it is preferred that the absorption wavelength of the photo-polymerization initiator is 300 nm or longer and the light-emission wavelength of the fluorescent whitening agent is in the range of 400 nm to 600 nm. Further, it is preferred that the absorption wavelength of the fluorescent whitening agent is in the range of 200 nm to 400 nm and the light-emission wavelength is in the range of 400 nm to 600 nm. Further, it is preferred that the absorption wavelength of the photo-polymerization initiator is in the range of 300 nm to 450 nm.

The fluorescent whitening agent-containing ink composition of the invention is constituted such that it contains at least a polymerizable compound, a photo-polymerization initiator, a polymerization accelerator and a fluorescent whitening agent and the absorption wavelength band of the photo-polymerization initiator overlaps with the light-emission wavelength band of the fluorescent whitening agent, whereby an excellent curability can be realized.

As the polymerizable compound, photo-polymerization initiator and polymerization accelerator for use in the fluorescent whitening agent-containing ink composition of the invention, those enumerated above for the ink composition of the invention can be used.

As the photo-polymerization initiator for use in the fluorescent whitening agent-containing ink composition of the invention, among the photo-polymerization initiators mentioned above, it is suitable to use plurality of Irgacure 819, 360, 379, 1800, 1850 and 1870 in combination, each of which has absorption at a wavelength region of 400 nm to 450 nm in addition to a region of 300 nm to 400 nm.

The photo-polymerization initiator contained in the fluorescent whitening agent-containing ink composition of the invention is preferably in an amount of 0.1 to 15 wt %, more preferably 0.5 to 10 wt %. When the content is small, the polymerization rate decreases and the curability lowers. When the content is large, the molecular weight after curing decreases and the durability of the cured product lowers.

Examples of the fluorescent whitening agent for use in the fluorescent whitening agent-containing ink composition of the invention include pyrene derivatives, coumarin derivatives, oxazole derivatives, benzoxazole derivatives, thiazole derivatives, imidazole derivatives, benzimidazole derivatives, imidazolone derivatives, pyrazoline derivatives, benzidine derivatives, and stilbene derivatives.

Further, fluorescent whitening agents available as trade names of Hostalux KCB (comprising 2,2'-(1,4-naphthalene-divl)bis-benzoxazole), KVC, KS, KS-N, KS-C, KSB, KSB-2, KCU, KM-N, NSM, SNR, NR, N2R-200, Leukopur EGM (manufactured by Clariant GmbH), UVITEX OB, OB-C, OB-P (manufactured by Ciba Specialty Chemicals), Kayalight B, OS, OSN (manufactured by Nippon Kayaku Co., Ltd.), Hakkol P, OB (manufactured by Showa Chemical Industry Co., Ltd.), Whitefluor B, PSN, HCS, PHR, PCS (manufactured by Sumika Color Co., Ltd.), and NIKKAFLUOR RP, 2R, SB, KB, EFS, OB, SC 200, MC (manufactured by Nippon Chemical Works, Co., Ltd.) can be also used.

As the fluorescent whitening agent for use in the fluorescent whitening agent-containing ink composition of the invention, it is suitable to use Kayalight OS and Hostalux KCB singly or in combination, each having absorption at a wavelength range of 200 nm to 400 nm and emitting fluorescence of 400 nm to 500 nm.

The fluorescent whitening agent contained in the ink composition is preferably 0.001 to 5.0 wt %, more preferably 0.01 to 0.5 wt %. When the content is small, the effect is hardly obtained. Further, when an excess amount thereof is added, properties such as transparency and durability after curing may be adversely affected in some cases.

Further, in the fluorescent whitening agent-containing ink composition of the invention, as the polymerizable compound, an oligomer, a prepolymer and/or a resin emulsion may be contained in addition to the above monomer. The oligomer or prepolymer usable in the fluorescent whitening agent-containing ink composition of the invention is a molecule resulted from a certain degree of polymerization of the monomer and composed of about 2 to 20 repeating units. Since the oligomer or prepolymer has one or plural polymerizable functional groups, it can induce a copolymerization reaction with the monomer or the like to effect curing. Further, the resin emulsion usable in the invention is an emulsion in which polymer fine particles are dispersed and stabilized in a solvent and which contains a polymerizable functional group on the surfaces. Since it also contains one or plural polymerizable functional groups on the surface, it can induce a copolymerization reaction with the monomer or the like to effect curing.

The polymerization accelerator for use in the fluorescent whitening agent-containing ink composition of the present invention may be a conventionally used amine compound or fine particles having an amino group on their surfaces, as well as the above-mentioned fine particles having a polymerizable functional group.

The amine compound is preferably an aminobenzoate derivative, and examples thereof include the above-described aminobenzoate derivatives.

The fine particles having an amino group on their surfaces are not particularly limited. As for the preparation method, it can be prepared by introducing an amine onto the fine particle surface through a chemical reaction, for example, by introducing an amino group onto the fine particle surface through a chemical reaction. Specifically, there may be mentioned a method comprising preparing silica fine particles having a large number of hydroxyl groups through a sol-gel reaction of a tetraalkoxysilane compound, such as tetraethoxysilane (TEOS) or tetramethoxysilane (TMOS), and then reacting the hydroxyl groups with a compound having an amino group such as a coupling agent having an N,N-dimethylamino group or an N-methylamino group, to thereby introduce an amino group on the surface of the silica fine particles.

The fine particles include those described above as the fine particles for use in the fine particles having a polymerizable functional group.

The fluorescent whitening agent-containing ink composition of the invention may contain a coloring material. The kind and amount of the coloring material to be added are the same as those described for the ink composition of the invention.

The ink composition, transparent ink composition, and fluorescent whitening agent-containing ink composition of the invention are suitably used for an inkjet recording method in which they are applied on a substrate, a recording medium or the like, or attached thereto by ejection or the like according to an inkjet recording method, and then subjected to ultraviolet irradiation.

The irradiation amount of the ultraviolet ray varies depending on the amount and thickness of the ink composition attached on the substrate or recording medium, and hence cannot be strictly specified and preferred conditions are appropriately selected. For example, the irradiation amount of the ultraviolet ray is 10 mJ/cm$^2$ or more and 10,000 mJ/cm$^2$ or less, and preferably, 50 mJ/cm$^2$ or more and 6,000 mJ/cm$^2$ or less. When the irradiation amount of the ultraviolet ray falls within such a range, a sufficient curing reaction can be attained.

Further, the ultraviolet light for irradiation is preferably an ultraviolet ray of a long wavelength range of 350 nm or longer which does not generate ozone from the standpoint of safety and environment. Further, preferred is an ultraviolet light for irradiation which does not have a continuous spectrum and has a narrow light-emission peak width. The wavelength range of the light-emission peak is preferably in the range of 350 to 420 nm.

The ultraviolet-irradiating member is not particularly limited, but an ultraviolet light-emitting semiconductor device such as an ultraviolet LED or an ultraviolet light-emitting semiconductor laser is preferred in view of energy consumption, miniaturization, and lamp life. When the ultraviolet LED is used, it is preferred to combine two or more of LED's different in light-emission peak, e.g., an LED having a light-emission peak wavelength of 365 nm and an LED having a light-emission peak wavelength of 395 nm. In the case of the fluorescent whitening agent-containing ink composition, it is particularly preferred to combine LED's having light-emission peaks of 365 nm, 380 nm, 395 nm, and 400 nm.

As the other ultraviolet-irradiating member, there may be mentioned a lamp such as a metal halide lamp, a xenon lamp, a carbon arc lamp, a chemical lamp, a low pressure mercury lamp, or a high-pressure mercury lamp. For example, a commercially available one such as H lamp, D lamp, or V lamp manufactured by Fusion System may be also used.

Further, in the recording method using the ink composition, transparent ink composition, and fluorescent whitening agent-containing ink composition of the invention, heating may be conducted before, simultaneously with, or after ultraviolet irradiation. Hearing may be achieved by a heating method in which a recording medium is brought into contact with a heat source, a heating method in which a recording medium is heated without contact by irradiation with an infrared ray or microwave (an electromagnetic wave having a maximum wavelength of about 2,450 MHz) or blowing hot air, or the like.

EXAMPLES

The present invention will be illustrated in greater detail with reference to the following Examples, but the invention should not be construed as being limited thereto.

Example 1A

1. Preparation of Polymerizable Fine Particles 1A and Dispersion Thereof

To a 200 mL Erlenmeyer flask was added 88.1 parts by weight of a silica sol IPA-ST [an isopropyl alcohol (hereinafter abbreviated as "IPA") dispersion having a silica concentration of 30 wt %, manufactured by Nissan Chemical Industries, Ltd.] and then 7.9 parts by weight of a silane coupling agent Siia-Ace S710 (3-methacryloxypropyltrimethoxysilane, manufactured by Chisso Corp.) was added thereto. Under stirring with a magnetic stirrer, 4 parts by weight of hydrochloric acid having a concentration of 0.05 mol/L was added thereto and the reaction was carried out under stirring at room temperature for 24 hours. As a result, IPA Dispersion A containing Polymerizable Fine Particles 1A having a methacryl group (MPS) was obtained.

To a 300 mL round-bottom flask were added 70 parts by weight of N-vinylformamide (hereinafter also referred to as "NVF", Beam Set 770, manufactured by Arakawa Chemical Industries, Ltd.) and 100 parts by weight of the above Dispersion A, and then IPA was removed by evaporation using a rotary evaporator to obtain Dispersion B containing Polymerizable Fine Particles 1A in a concentration of 30 wt %.

2. Preparation of Pigment Dispersions 2-1. (Yellow) Pigment Dispersion C;

C. I. Pigment Yellow (P. Y.) 74 as a pigment of a coloring material, a polyurethane resin (average molecular weight: about 20,000) (hereinafter also referred to as "Dispersant"), and NVF were mixed in a ratio of pigment/Dispersant/NVF=15/5/80 and were dispersed in a sand mill (manufactured by Yasukawa Seisakusho) together with glass beads (diameter: 1.7 mm, 1.5 times the weight of the mixture) for 2 hours. Thereafter, glass beads were separated to prepare Pigment Dispersion C (pigment concentration: 15 wt %).

2-2. (Magenta) Pigment Dispersion D:

Pigment Dispersion D (pigment concentration: 15 wt %) was prepared in the same manner as in the case of the above pigment Dispersion C except that the pigment was changed to C. I. Pigment Red (P. R.) 122.

2-3. (Cyan) Pigment Dispersion E:

Pigment Dispersion E (pigment concentration: 15 wt %) was prepared in the same manner as in the case of the above Pigment Dispersion C except that the pigment was changed to C. I. Pigment Blue (P. B.) 15:3.

2-4. (Black) Pigment Dispersion F:

Pigment Dispersion F (pigment concentration: 15 wt %) was prepared in the same manner as in the case of the above Pigment Dispersion C except that the pigment was changed to C. I. Pigment Black (P. Bk.) 7.

3. Preparation of Ink Compositions 3-1. Yellow Pigment Ink Composition (Y):

To a light-shielding vessel were added 20 parts by weight of Dispersion B and 10 parts by weight of Pigment Dispersion C, and then 29 parts by weight of NVF, 25 parts by weight of tripropylene glycol diacrylate (hereinafter referred to as "TPGBA", Aronix M-220, manufactured by Toagosei Co., Ltd.), 10 parts by weight of glycerin EO-modified triacrylate (HK ester A-Gly-3E, hereinafter also referred to as "AGE3", manufactured by Snin-nakamura Chemical Corp.), 4.0 parts by weight of Irgacure 819 (bis(2,4,6-trimethylbenzoyl)phenylphosphine oxide, manufactured by Ciba Specialty Chemicals), 1.0 parts by weight of Irgacure 369 (2-benzyl-2-dimethylamino-1-(4-morpholinophenyl)-butanone-1, manufactured by Ciba Specialty Chemicals), and 1 parts by weight of Darocur EHA (2-ethylhexyl-4-dimethoxyaminobenzoate, manufactured by Ciba Specialty Chemicals) were added thereto, followed by 1 hour of stirring with a magnetic stirrer and mixing. Then, the mixture was filtrated through a membrane filter of 5 μm under an environment of shielding from an ultraviolet ray to prepare a yellow ink composition having the following composition.

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable Fine Particles 1A | 6.0 wt % |
| C. I. Pigment Yellow 74 (coloring material) | 1.5 wt % |

3-2. Magenta, Cyan, Black Pigment Ink Compositions:

Similarly, each ink composition having the following composition was prepared using Dispersion D, E, or F instead of Dispersion C.

Magenta Pigment Ink Composition (M)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable Fine Particles 1A | 6.0 wt % |
| C. I. Pigment Red 122 (coloring material) | 1.5 wt % |

Cyan Pigment Ink Composition (C)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable Fine Particles 1A | 6.0 wt % |
| C. I. Pigment Blue 15:3 (coloring material) | 1.5 wt % |

Black Pigment Ink Composition (B)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable fine particles 1A | 6.0 wt % |
| C. I. Pigment Black 7 (coloring material) | 1.5 wt % |

Example 2A

1. Preparation of Polymerizable Fine Particles 2A and Dispersion Thereof

To a 200 mL Erlenmeyer flask was added 88.5 parts by weight of a silica sol IPA-ST (an IPA dispersion having a silica concentration of 30 wt %, manufactured by Nissan Chemical Industries, Ltd.) and then 7.5 parts by weight of a silane coupling agent KBM-5103 (3-acryloxypropyltrimethoxysilane, manufactured by Shin-Etsu Chemical Co., Ltd.) was added thereto. Under stirring with a magnetic stirrer, 4 parts by weight of hydrochloric acid having a concentration of 0.05 mol/L was added thereto and the reaction was carried out under stirring at room temperature for 24 hours. As a result, IPA Dispersion G containing Polymerizable Pine Particles 2A having an acryl group (APS) was obtained.

To a 300 mL round-bottom flask were added 70 parts by weight of NVF and 100 parts by weight of the above Dispersion G, and then IPA was removed by evaporation using a rotary evaporator to obtain Dispersion H containing Polymerizable Fine Particles 2A in a concentration of 30 wt %.

2. Preparation of Ink Compositions

Each ink composition (Y, M, C, K) having the following composition was prepared in the same manner as in the above Example 1A except that Dispersion H was used instead of Dispersion B.

Yellow Pigment Ink Composition (Y)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable Fine Particles 2A | 6.0 wt % |
| C. I. Pigment Yellow 74 (coloring material) | 1.5 wt % |

Magenta Pigment Ink Composition (M)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable fine particles 2A | 6.0 wt % |
| C. I. Pigment Red 122 (coloring material) | 1.5 wt % |

Cyan Pigment Ink Composition (C)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable fine particles 2A | 6.0 wt % |
| C. I. Pigment Blue 15:3 (coloring material) | 1.5 wt % |

Black Pigment Ink Composition (B)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |

-continued

| | |
|---|---|
| Polymerizable fine particles 2A | 6.0 wt % |
| C. I. Pigment Black 7 (coloring material) | 1.5 wt % |

Example 3A

1. Preparation of Titanium Dioxide Fine Particles (White Pigment) and Dispersion Thereof A titanium-containing ore was dissolved in sulfuric acid to obtain a titanium sulfate solution. To a hydrous titanium oxide obtained by hydrolyzing the titanium sulfate solution were added 0.50 part by weight of ammonium phosphate, 0.30 part by weight of potassium sulfate, and 0.30 part by weight of aluminum sulfate relative to 100 parts by weight, and the hydrous titanium oxide was heated in a laboratory rotary muffle furnace until the product temperature reached 1,020° C. When the resulting titanium dioxide fine particles were cooled to room temperature and observed on a transmission electron microscopic photograph, it was found that the particle was anatase type one having an average primary particle size of 0.13 μm. Then, 1500 g of the surface-treated titanium dioxide fine particles and 1000 g of isopropyl alcohol (hereinafter referred to as IPA) were mixed with each other and zirconium beads (1.0 mm) was charged thereto in an amount of 1.5 times the weight of the slurry in a sand mill (manufactured by Yasukawa Seisakusho). After 2 hours of dispersion, the beads were removed to obtain a 60 wt % IPA dispersion of titanium dioxide fine particles (white pigment) (Dispersion I) for use in a white ink for inkjet.

2. White Pigment Ink Composition (W)

To a 300 mL round-bottom flask were added 140 parts by weight of NVF and 100 parts by weight of the above White Pigment Dispersion I, and IPA was removed by evaporation using a rotary evaporator to obtain Monomer Dispersion J containing titanium dioxide fine particles in an amount of 30 wt %.

To a light-shielding vessel was added 10 parts by weight of Monomer Dispersion 0 and then 10 parts by weight of Dispersion A, 39 parts by weight of NVF, 25 parts by weight of TPGDAc, 10 parts by weight of AGE3, 4.0 parts by weight of Irgacure 819, 1.0 part by weight of Irgacure 369, and 1 part by weight of Darocur ERA were added thereto and the whole was stirred and mixed for 1 hour with a magnetic stirrer to prepare a white pigment ink composition (Y) having the following composition.

| | |
|---|---|
| NVF | 53 wt % |
| TPGDA | 25 wt % |
| AGE3 | 10 wt % |
| Irgacure 819 | 4.0 wt % |
| Irgacure 369 | 1.0 wt % |
| Darocur EHA | 1.0 wt % |
| Polymerizable fine particles 1A | 3.0 wt % |
| Titanium dioxide fine particles (coloring material) | 3.0 wt % |

Example 4A

A black pigment ink composition (K) having the following composition was prepared in the same manner as in the preparation of the black pigment ink composition (K) of the above Example 1A except that Darocur TPO (2,4,6-trimethylbenzoyl-diphenyl-phosphine oxide, manufactured by Ciba Specialty Chemicals) was used instead of Irgacure 819.

Black Pigment Ink Composition (K)

| | |
|---|---|
| NVF | 51 wt % |
| TPGDA | 25 wt % |
| AGE3 | 10 wt % |
| Dispersant | 0.5 wt % |
| Darocur TPO | 4.0 wt % |
| Irgacure 369 | 1.0 wt % |
| Darocur EHA | 1.0 wt % |
| Polymerizable Fine Particles 1A | 6.0 wt % |
| C. I. Pigment Black 7 (coloring material) | 1.5 wt % |

Example 5A

A black pigment ink composition (K) having the following composition was prepared in the same manner as in the preparation of the black pigment ink composition (K) of the above Example 1A except that Darocur EDB (ethyl-4-dimethylaminobenzoate, manufactured by Ciba Specialty Chemicals) was used instead of Darocur EHA.

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EDB | 1.0 wt % |
| Polymerizable Fine Particles 1A | 6.0 wt % |
| C. I. Pigment Black 7 (coloring material) | 1.5 wt % |

Comparative Example 1A

Ink compositions (Y, M, C, K) having the following compositions were prepared in the same manner as in the preparation of cue ink compositions (Y, M, C, K) of the above Example 1A except that Irgacure 369 was eliminated and 5.0 parts by weight of Irgacure 819 was used.

Yellow Pigment Ink Composition (Y)

| | |
|---|---|
| NVF | 51 wt % |
| TPGDA | 25 wt % |
| AGE3 | 10 wt % |
| Dispersant | 0.5 wt % |
| Irgacure 819 | 5.0 wt % |
| Darocur EHA | 1.0 wt % |
| Polymerizable Fine Particles 1A | 6.0 wt % |
| C. I. Pigment Yellow 74 (coloring material) | 1.5 wt % |

Magenta Pigment Ink Composition (M)

| | |
|---|---|
| NVF | 51 wt % |
| TPGDA | 25 wt % |
| AGE3 | 10 wt % |
| Dispersant | 0.5 wt % |
| Irgacure 819 | 5.0 wt % |
| Darocur EHA | 1.0 wt % |
| Polymerizable Fine Particles 1A | 6.0 wt % |
| C. I. Pigment Red 122 (coloring material) | 1.5 wt % |

Cyan Pigment Ink Composition (C)

| | |
|---|---|
| NVF | 51 wt % |
| TPGDA | 25 wt % |
| AGE3 | 10 wt % |
| Dispersant | 0.5 wt % |
| Irgacure 819 | 5.0 wt % |
| Darocur EHA | 1.0 wt % |
| Polymerizable Fine Particles 1A | 6.0 wt % |
| C. I. Pigment Blue 15:3 (coloring material) | 1.5 wt % |

Black Pigment Ink Composition (K)

| | |
|---|---|
| NVF | 51 wt % |
| TPGDA | 25 wt % |
| AGE3 | 10 wt % |
| Dispersant | 0.5 wt % |
| Irgacure 819 | 5.0 wt % |
| Darocur EHA | 1.0 wt % |
| Polymerizable Fine Particles 1A | 6.0 wt % |
| C. I. Pigment Black 7 (coloring material) | 1.5 wt % |

Comparative Example 2A

A black pigment ink composition (K) having the following composition was prepared in the same manner as in the preparation of the black pigment ink composition (K) of the above Example 1A except that Irgacure 819 was eliminated and 5.0 parts by weight of Irgacure 369 was used.
Black Pigment Ink Composition (K)

| | |
|---|---|
| NVF | 51 wt % |
| TPGDA | 25 wt % |
| AGE3 | 10 wt % |
| Dispersant | 0.5 wt % |
| Irgacure 369 | 5.0 wt % |
| Darocur EHA | 1.0 wt % |
| Polymerizable Fine Particles 1A | 6.0 wt % |
| C. I. Pigment Black 7 (coloring material) | 1.5 wt % |

Comparative Example 3A

A black pigment ink composition (K) having the following composition was prepared in the same manner as in the preparation of the black pigment ink composition (K) of the above Example 1A except that 5.0 parts by weight of Darocur TPO was used instead of Irgacure 819 and Irgacure 369.
Black Pigment Ink Composition (K)

| | |
|---|---|
| NVF | 51 wt % |
| TPGDA | 25 wt % |
| AGE3 | 10 wt % |
| Dispersant | 0.5 wt % |
| Darocur TPO | 5.0 wt % |
| Darocur EHA | 1.0 wt % |
| Polymerizable Fine Particles 1A | 6.0 wt % |
| C. I. Pigment Black 7 (coloring material) | 1.5 wt % |

Comparative Example 4A

A black pigment ink composition (K) having the following composition was prepared in the same manner as in the preparation of the black pigment ink composition (K) of the above Example 1A, except that 5.0 parts by weight of Darocur 1173 was used instead of Irgacure 819 and Irgacure 369.

In this connection, Darocur 1173 is a photo-polymerization initiator having no absorption at a wavelength range of 365 nm or longer.
Black Pigment Ink Composition (K)

| | |
|---|---|
| NVF | 51 wt % |
| TPGDA | 25 wt % |
| AGE3 | 10 wt % |
| Dispersant | 0.5 wt % |
| Darocur 1173 | 5.0 wt % |
| Darocur EHA | 1.0 wt % |
| Polymerizable Fine Particles 1A | 6.0 wt % |
| C. I. Pigment Black 7 (coloring material) | 1.5 wt % |

Comparative Example 5A

A black pigment ink composition (K) having the following composition was prepared in the same manner as in the preparation of the black pigment ink composition (K) of the above Example 1A except that Darocur 1173 was used instead of Irgacure 369.
Black Pigment Ink Composition (K)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Darocur 1173 | 1.0 wt % |
| Darocur EHA | 1.0 wt % |
| Polymerizable Fine Particles 1A | 6.0 wt % |
| C. I. Pigment Black 7 (coloring material) | 1.5 wt % |

Comparative Example 6A

A black pigment ink composition (K) having the following composition was prepared in the same manner as in the preparation of the black pigment ink composition (K) of the above Example 5A except that Irgacure 359 was used instead of Irgacure 819.
Black Pigment Ink Composition (K)

| | |
|---|---|
| NVF | 51 wt % |
| TPGDA | 25 wt % |
| AGE3 | 10 wt % |
| Dispersant | 0.5 wt % |
| Irgacure 369 | 4.0 wt % |
| Darocur 1173 | 1.0 wt % |
| Darocur EHA | 1.0 wt % |
| Polymerizable Fine Particles 1A | 6.0 wt % |
| C. I. Pigment Black 7 (coloring material) | 1.5 wt % |

Comparative Example 7A

A black pigment ink composition (K) having the following composition was prepared in the same manner as in the preparation of the black pigment ink composition (K) of the above Example 5A except that Darocur TPO was used instead of Irgacure 819.
Black Pigment Ink Composition (K)

| | |
|---|---|
| NVF | 51 wt % |
| TPGDA | 25 wt % |

-continued

| | |
|---|---|
| AGE3 | 10 wt % |
| Dispersant | 0.5 wt % |
| Darocur TPO | 4.0 wt % |
| Darocur 1173 | 1.0 wt % |
| Darocur EHA | 1.0 wt % |
| Polymerizable Fine Particles 1A | 6.0 wt % |
| C. I. Pigment Black 7 (coloring material) | 1.5 wt % |

Comparative Example 8A

1. Preparation of Silica Particle Dispersion

To a 300 mL round-bottom flask were added 70 parts by weight of NVF and 100 parts by weight of a silica sol IPA-ST (an IPA dispersion having a silica concentration of 30 wt %, manufactured by Nissan Chemical Industries, Ltd.), and then IPA was removed by evaporation using an evaporator to obtain Dispersion K containing silica particles in a concentration of 30 wt %.

2. Preparation of Ink Composition

A black pigment ink composition (K) having the following composition was prepared in the same manner as in the preparation of the black pigment ink composition (K) of the above Example 1A except that Dispersion K was used instead of Dispersion B.

Black Pigment Ink Composition (K)

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Silica particles | 6.0 wt % |
| C. I. Pigment Black 7 (coloring material) | 1.5 wt % |

Curing Test

Each of the above ink compositions was dropped on a glass substrate in an amount of about 0.05 mL and a curing test was carried out. The ultraviolet irradiation was conducted by combining the following two irradiation devices. After curing treatment was carried out under a curing condition of an integrated light intensity of 5000 mJ/cm$^2$, the following visual evaluation of curability was carried out. The results are shown in the following tables.

Irradiation Device 1: Light source: ultraviolet LED UCCU033 (manufactured by Nichia Corp.)
Peak wavelength: 365 nm
Irradiation condition: 22 mW/cm$^2$ Irradiation Device 2: Light source: handy ultraviolet light (using LED)
Peak wavelength: 395 nm
Irradiation condition: 20 mW/cm$^2$ Curability Evaluation Index A: Both of surface and inside are completely cured.
B: There is observed a state where only surface is cured but inside is liquid, a state where only inside is cured but surface is not cured, or a state where cured parts and uncured parts are present on surface and thus surface is heterogeneous.
C: No curing is observed and the composition remains liquid.

TABLE 1A

| | | Monomer 1 | Monomer 2 | Monomer 3 | Dispersant | PI-1 | PI-2 | Accelerator 1 | Accelerator 2 | Coloring material | Curing test |
|---|---|---|---|---|---|---|---|---|---|---|---|
| Example 1A | Y | NVF 51.0 | TPGDA 25.0 | AGE3 10.0 | 0.5 | Irgacure 819 4.0 | Irgacure 369 1.0 | MPS 6.0 | Darocur EHA 1.0 | PY74 1.5 | A |
| | M | NVF 51.0 | TPGDA 25.0 | AGE3 10.0 | 0.5 | Irgacure 819 4.0 | Irgacure 369 1.0 | MPS 6.0 | Darocur EHA 1.0 | PR122 15 | A |
| | C | NVF 51.0 | TPGDA 25.0 | AGE3 10.0 | 0.5 | Irgacure 819 4.0 | Irgacure 369 1.0 | MPS 6.0 | Darocur EHA 1.0 | PB15:3 1.5 | A |
| | K | NVF 51.0 | TPGDA 25.0 | AGE3 10.0 | 0.5 | Irgacure 819 4.0 | Irgacure 369 1.0 | MPS 6.0 | Darocur EHA 1.0 | PBk7 1.5 | A |
| Example 2A | Y | NVF 51.0 | TPGDA 25.0 | AGE3 10.0 | 0.5 | Irgacure 819 4.0 | Irgacure 369 1.0 | APS 6.0 | Darocur EHA 1.0 | PY74 1.5 | A |
| | M | NVF 51.0 | TPGDA 25.0 | AGE3 10.0 | 0.5 | Irgacure 819 4.0 | Irgacure 369 1.0 | APS 6.0 | Darocur EHA 1.0 | PR122 15 | A |
| | C | NVF 51.0 | TPGDA 25.0 | AGE3 10.0 | 0.5 | Irgacure 819 4.0 | Irgacure 369 1.0 | APS 6.0 | Darocur EHA 1.0 | PB15:3 1.5 | A |
| | K | NVF 51.0 | TPGDA 25.0 | AGE3 10.0 | 0.5 | Irgacure 819 4.0 | Irgacure 369 1.0 | APS 6.0 | Darocur EHA 1.0 | PBk7 15 | A |
| Example 3A | K | NVF 51.0 | TPGDA 25.0 | AGE3 10.0 | 0.5 | Irgacure 819 4.0 | Irgacure 369 1.0 | MPS 6.0 | Darocur EHA 1.0 | PBk7 1.5 | A |
| | W | NVF 53.0 | TPGDA 25.0 | AGE3 10.0 | — | Irgacure 819 4.0 | Irgacure 369 10 | MPS 3.0 | Darocur EHA 1.0 | TiO$_2$ 3.0 | A |
| Example 4A | K | NVF 51.0 | TPGDA 25.0 | AGE3 10.0 | 0.5 | Darocur TPO 4.0 | Irgacure 369 1.0 | MPS 6.0 | Darocur EHA 1.0 | PBk7 1.5 | A |
| Example 5A | K | NVF 51.0 | TPGDA 25.0 | AGE3 10.0 | 0.5 | Irgacure 319 4.0 | Irgacure 369 1.0 | MPS 3.0 | Darocur EDB 1.0 | PBk7 1.5 | A |

TABLE 2A

|  |  | Monomer 1 | Monomer 2 | Monomer 3 | Dispersant | PI-1 | PI-2 | Accelerator 1 | Accelerator 2 | Coloring material | Curing test |
|---|---|---|---|---|---|---|---|---|---|---|---|
| Comparative Example 1A | Y | NVF 51.0 | TPGDA 25.0 | AGE3 10.0 | 0.5 | Irgacure 819 5.0 | — | MPS 6.0 | Darocur EHA 1.0 | PY74 1.5 | B |
|  | M | NVF 51.0 | TPGDA 25.0 | AGE3 10.0 | 0.5 | Irgacure 819 5.0 | — | MPS 6.0 | Darocur EHA 1.0 | PR122 1.5 | B |
|  | C | NVF 51.0 | TPGDA 25.0 | AGE3 10.0 | 0.5 | Irgacure 819 5.0 | — | MPS 6.0 | Darocur EHA 1.0 | PB15:3 1.5 | B |
|  | K | NVF 51.0 | TPGDA 25.0 | AGE3 10.0 | 0.5 | Irgacure 819 5.0 | — | MPS 6.0 | Darocur EHA 1.0 | PBk 1.5 | B |
| Comparative Example 2A | K | NVF 51.0 | TPGDA 25.0 | AGE3 10.0 | 0.5 | Irgacure 369 5.0 | — | MPS 6.0 | Darocur EHA 1.0 | PBk 1.5 | B |
| Comparative Example 3A | K | NVF 51.0 | TPGDA 25.0 | AGE3 10.0 | 0.5 | Darocur TPO 5.0 | — | MPS 6.0 | Darocur EHA 1.0 | PBk 1.5 | B |
| Comparative Example 4A | K | NVF 51.0 | TPGDA 25.0 | AGE3 10.0 | 0.5 | Darocur 1173 5.0 | — | MPS 6.0 | Darocur EHA 1.0 | PBk 1.5 | B |
| Comparative Example 5A | K | NVF 51.0 | TPGDA 25.0 | AGE3 10.0 | 0.5 | Irgacure 819 4.0 | Darocur 1173 1.0 | MPS 6.0 | Darocur EHA 1.0 | PBk 1.5 | B |
| Comparative Example 6A | K | NVF 51.0 | TPGDA 25.0 | AGE3 10.0 | 0.5 | Irgacure 369 4.0 | Darocur 1173 1.0 | MPS 6.0 | Darocur EHA 1.0 | PBk 1.5 | B |
| Comparative Example 7A | K | NVF 51.0 | TPGDA 25.0 | AGE3 10.0 | 0.5 | Darocur TPO 4.0 | Darocur 1173 1.0 | MPS 6.0 | Darocur EHA 1.0 | PBk 1.5 | B |
| Comparative Example 8A | K | NVF 51.0 | TPGDA 25.0 | AGE3 10.0 | 0.5 | Irgacure 819 4.0 | Irgacure 369 1.0 | silica 6.0 | Darocur EHA 1.0 | PBk 1.5 | B |

Printing Test

Utilizing Inkjet Printer SM-930C manufactured by Seiko Epson Corp., the ink compositions of the above Examples were charged into corresponding nozzle lines, respectively, and solid patterns and characters were printed under ejection conditions of normal temperature and normal pressure. As recording media, an OHP film (XEROX FILM <no frame>, manufactured by Fuji Xerox Co., Ltd.) and a vinyl chloride sheet Viewcal (VC2000, manufactured by Sakurai) were used.

Then, printing and curing treatment were carried out by ultraviolet irradiation under condition of an integrated light intensity of 5000 mJ/cm$^2$ with combining the above two ultraviolet irradiation devices placed at paper exit.

As a result, it was confirmed that solid patterns and characters could be satisfactorily printed on both of the above media.

1. Process for Producing Polymerizable Fine Particles 1B

To a 200 mL Erlenmeyer flask was added 88.1 parts by weight of a silica sol IPA-ST [an isopropyl alcohol (hereinafter abbreviated as IPA) dispersion having a silica concentration of 30 wt %, manufactured by Nissan Chemical Industries, Ltd.], and then 7.9 parts by weight of a silane coupling agent Sila-Ace S710 (3-methacryloxypropyltrimethoxysilane, manufactured by Chisso Corp.) was added thereto. Under stirring with a magnetic stirrer, 4 parts by weight of hydrochloric acid having a concentration of 0.05 mol/L was added thereto and the reaction was carried out under stirring at room temperature for 24 hours. As a result, IPA Dispersion A' containing Polymerizable Fine Particles 1B was obtained.

2. Process for Producing Polymerizable Fine Particles 2B

To a 200 mL Erlenmeyer flask was added 88.5 parts by weight of a silica sol IPA-ST (an IPA dispersion having a silica concentration of 30 wt %, manufactured by Nissan Chemical Industries, Ltd.), and then 7.5 parts by weight of a silane coupling agent KBM-5103 (3-acryloxypropyltrimethoxysilane, manufactured by Shin-Etsu Chemical Co., Ltd.) was added thereto. Under stirring with a magnetic stirrer, 4 parts by weight of hydrochloric acid having a concentration of 0.05 mol/L was added thereto and the reaction was carried out under stirring at room temperature for 24 hours. As a result, IPA Dispersion B' containing Polymerizable Fine Particles 2B was obtained.

3. Process for Producing Ink Composition 1B

Example 1B

To a 300 mL round-bottom flask were added 70 parts by weight of N-vinylformamide (hereinafter also referred to as "NVF", Beam Set 770, manufactured by Arakawa Chemical industries, Ltd.) and 100 parts by weight of Dispersion A', and then IPA was removed by evaporation using a rotary evaporator to obtain Dispersion C containing Polymerizable Fine Particles 1B in a concentration of 30 wt %.

Subsequently, to a 100 mL light-shielding sample bottle was added 20 g of the monomer solution c, and then 61 g of NVF, 14 g of tripropylene glycol diacrylate (Aronix M-220, manufactured by Toagosei Co., Ltd.), 2.5 g of Irgacure 819 (bis(2,4,6-trimethylbenzoyl)-phenylphosphine oxide, manufactured by Ciba Specialty Chemicals), 2.5 g of Irgacure 369 (2-benzyl-2-dimethylamino-1-(4-morpholinophenyl)-butanone-1, manufactured by Ciba Specialty Chemicals), and 1.0 g of Darocur EHA (2-ethylhexyl-4-dimethoxyaminobenzoate, manufactured by Ciba Specialty Chemicals) were added thereto, followed by 30 minutes of stirring with a magnetic stirrer to prepare Ink Composition 1B. The Ink Composition 1B was transparent and showed a blue color.

4. Process for Producing Ink Composition 2B

Example 2B

To a 300 mL round-bottom flask were added 70 parts by weight of NVF and 100 parts by weight of Dispersion B', and then IPA was removed by evaporation using a rotary evaporator to obtain Monomer Solution D containing Polymerizable Pine Particles 2B in a concentration of 30 wt %.

To a 100 mL light-shielding sample bottle was added 20 g of Monomer Solution D, and than 56 g of NVF, 14 g of tripropylene glycol diacrylate, 5.0 g of glycerin EO-adducted triacrylate (NK ester A-Gly-3E, manufactured by Shin-nakamura Chemical Corp.), 2.5 g of Irgacure 819, 2.5 g of Irgacure 369, and 1.0 g of Darocur EHA were added thereto, followed by 30 minutes of stirring with a magnetic stirrer to prepare Ink Composition 2B. The Ink Composition 2B was also transparent and showed a blue color.

5. Process for Producing Ink Composition 3B

Comparative Example 1B

To a 300 mL round-bottom flask were added 70 parts by weight of (2-methyl-2-ethyl-1,3-dioxolan-4-yl)methyl acrylate (Medol-10, manufactured by Osaka Organic Chemical Industry, Ltd.) and 100 parts by weight of Dispersion A', and then IPA was removed by evaporation using a rotary evaporator to obtain Monomer Solution E containing Polymerizable Fine Particles 2B in a concentration of 30 wt %.

To a 100 mL light-shielding sample bottle was added 20 g of Monomer Solution E, and then 56 g of Medol-10, 14 g of tripropylene glycol diacrylate, 5.0 g of glycerin EO-adducted triacrylate, 2.5 g of Irgacure 819, 2.5 g of Irgacure 369, and 1.0 g of Darocur EHA were added thereto, followed by 30 minutes of stirring with a magnetic stirrer to prepare Ink Composition 3B. The Ink Composition 3B was transparent and showed a light yellow color.

6. Process for Producing Ink Composition 4B

Comparative Example 2B

Ink Composition 4B was prepared by mixing 75 g of NVF, 14 g of tripropylene glycol diacrylate, 5.0 g of glycerin EO-adducted triacrylate, 2.5 g of Irgacure 819, 2.5 g of Irgacure 369, and 1.0 g of Darocur EHA, followed by 30 minutes of stirring with a magnetic stirrer. Ink Composition 4B was also transparent and showed a light yellow color.

7. Process for Producing Ink Composition 5B

Comparative Example 3B

To a 300 mL round-bottom flask were added 70 parts by weight of NVF and 100 parts by weight of the silica sol IPA-ST, and then IPA was removed by evaporation using a rotary evaporator to obtain Monomer Solution F containing silica fine particles in a concentration of 30 wt %.

Subsequently, to a 100 mL light-shielding sample bottle was added 20 g of Monomer Solution F, and then 61 g of NVF, 14 g of tripropylene glycol diacrylate, 2.5 g of Irgacure 819, 2.5 g of Irgacure 369, and 1.0 g of Darocur EHA were added thereto, followed by 30 minutes of stirring with a magnetic stirrer to prepare Ink Composition 5B. Ink Composition 5B was transparent and showed a light yellow color.

8. Process for Producing Ink Composition 6B

Comparative Example 4B

Ink Composition 6B was prepared in the same manner as in Comparative Example 2B except that NVF was replaced by an equal amount of 2-methoxyethyl acrylate. Ink Composition 6B was transparent and showed a light yellow color.

9. Process for Producing Ink Composition 7B

Comparative Example 5B

Ink Composition 7B was prepared in the same manner as in Comparative Example 3B except that NVF was replaced by an equal amount of 2-methoxyethyl acrylate. Ink Composition 7B was transparent and showed a light yellow color.

10. Irradiation Experiment

Each of the above ink compositions was dropped on a glass substrate. Curing treatment was performed under conditions of irradiation intensity of 22 mW/cm$^2$ using an ultraviolet LED (i-LED manufactured by Nichia Chemical industries, Co., Ltd., peak wavelength: 365 nm) so as to be an integrated light intensity of 110 mJ/cm$^2$, and then visual evaluation was carried out.

11. Evaluation Results

After the irradiation experiment, the samples of Examples 1B and 2B were cured by the ultraviolet irradiation, and the blue color disappeared and the samples were changed into transparent colorless to light yellow ones. To the contrary, the samples of Comparative Examples 1B to 5B were cured but the color was not changed and remained light yellow.

Example 1C

1. Process for Producing Transparent Ink Composition 1C

Into a 100 mL light-shielding sample bottle were weighed 73.0 g of N-vinylformamide (hereinafter referred to as "NVF", a trade name of Beam Set 770, manufactured by Arakawa Chemical Industries, Ltd.), 17.5 g of tripropylene glycol diacrylate (hereinafter referred to as "TPGDA", a trade name of Aronix M-220, manufactured by Toagosei Co., Ltd.), and 7.5 g of glycerin EC-modified triacrylate (hereinafter referred to as A-Gly-3E, manufactured by Shin-nakamura Chemical Corp.), and then 0.8 g of Irgacure 819, 0.2 g of Irgacure 369, and 0.95 g of Darocur (manufactured, by Ciba Specialty Chemicals) were added thereto. After 30 minutes of stirring with a magnetic stirrer, 0.05 g of Kayalight OS was added and the whole was further stirred for 2 hours to prepare transparent Ink Composition 1C.

| | |
|---|---|
| NVF | 73.0 wt % |
| TPGDA | 17.5 wt % |
| A-Gly-3E | 7.5 wt % |
| Irgacure 819 | 0.8 wt % |
| Irgacure 369 | 0.2 wt % |
| Darocur EHA | 0.95 wt % |
| Kayalight OS | 0.05 wt % |

Example 2C

2. Process for Producing Cyan Ink Composition 1C

Cyan Ink Composition 1 having the following composition was prepared. The preparation was conducted as follows. A pigment as a coloring material and isopropyl alcohol (hereinafter referred to as "IPA") were dispersed in a sand mill (manufactured by Yasukawa Seisakusho) together with glass beads (diameter: 1.7 mm, 1.5 times the weight of the mixture)

for 2 hours. Thereafter, glass beads were separated to obtain IPA Pigment Dispersion A" of 15 wt %.

To a 300 ml round-bottom flask were added 85.0 g of Beam Set 770 and 100 g of IPA Pigment Dispersion A", and IPA was removed by evaporation using a rotary evaporator to obtain Pigment Dispersion B containing Pigment Blue 15:3 in a concentration of 15 wt %.

Into a 100 mL light-shielding sample bottle were weighed 51.0 g of Beam Set 770, 17.5 g of Aronix M-220, and 7.5 g of A-Gly-3E, and then 2.4 g of Irgacure 819, 0.6 g of Irgacure 369, and 0.9 g of Darocur EHA were added thereto. After 30 minutes of stirring with a magnetic stirrer, 0.1 g of Kayalight was added, followed by 2 hours of stirring. After individual components were thoroughly dissolved and mixed, 20.0 g of Pigment Dispersion B" was added thereto and the whole was further stirred for 1 hour to prepare Cyan Ink Composition 1C having the following composition.

| | |
|---|---|
| NVF | 68.0 wt % |
| TPGDA | 17.5 wt % |
| A-Gly-3E | 7.5 wt % |
| Irgacure 819 | 2.4 wt % |
| Irgacure 369 | 0.6 wt % |
| Darocur EHA | 0.9 wt % |
| C. I. Pigment Blue 15:3 | 3.0 wt % |
| Kayalight OS | 0.1 wt % |

Example 3C

3. Process for Producing White Ink Composition 1C

Process for Producing Titanium Dioxide Fine Particles:

A titanium-containing ore was dissolved in sulfuric acid to obtain a titanium sulfate solution. To a hydrous titanium oxide obtained by hydrolyzing the titanium sulfate solution were added 0.50 part by weight of ammonium phosphate, 0.30 part by weight of potassium sulfate, and 0.30 part by weight of aluminum sulfate relative to 100 parts by weight, and the hydrous titanium oxide was heated in a laboratory rotary muffle furnace until the product temperature reached 1,020° C. When the resulting titanium dioxide fine particles were cooled to room temperature and observed on a transmission electron microscopic photograph, it was found that the particle was anatase type one having an average primary particle size of 0.13 μm. Then, 1500 g of the surface-treated titanium dioxide fine particles and 1000 g of isopropyl alcohol were mixed with each other and zirconium, beads (1.0 mm) was charged thereto in an amount of 1.5 times the weight of the slurry in a sand mill (manufactured by Yasukawa Seisakusho). After 2 hours of dispersing, the beads were removed to obtain a 60 wt % IPA Dispersion C" of titanium dioxide fine particles for use in a white ink for inkjet.

To a 300 mL round-bottom flask were added 140 parts by weight of Beam Set 770 and 100 g of IPA Pigment Dispersion C", and IPA, was removed by evaporation using a rotary evaporator to obtain Pigment Dispersion D" containing titanium dioxide fins particles in a concentration of 30 wt %.

Into a 100 mL light-shielding sample bottle were weighed 51.0 g of Beam Set 770, 17.5 g of Aronix M-220, and 7.5 g of A-Gly-3E, and then 2.4 g of Irgacure 819, 0.6 g of Irgacure 369, and 0.9 g of Darocur EHA were added thereto. After 30 minutes of stirring with a magnetic stirrer, 0.1 g of Kayalight was added, followed by another 2 hours of stirring. After individual components were thoroughly dissolved and mixed, 20.0 g of Pigment Dispersion D" was added thereto and the whole was further stirred for 1 hour to prepare White Ink Composition 1C.

| | |
|---|---|
| NVF | 65.0 wt % |
| TPGDA | 17.5 wt % |
| A-Gly-3E | 7.5 wt % |
| Irgacure 819 | 2.4 wt % |
| Irgacure 369 | 0.6 wt % |
| Darocur EHA | 0.9 wt % |
| Kayalight OS | 0.1 wt % |
| Titanium dioxide fine particles | 6.0 wt % |

Example 4C

4. Process for Producing White Ink Composition 2C

White Ink Composition 2C having the following composition was prepared in the same manner as in Example 3C except that Kayalight OS was changed to Hostalux KCB.

| | |
|---|---|
| NVF | 65.0 wt % |
| TPGDA | 17.5 wt % |
| A-Gly-3E | 7.5 wt % |
| Irgacure 819 | 2.4 wt % |
| Irgacure 369 | 0.6 wt % |
| Darocur EHA | 0.9 wt % |
| Hostalux KCB | 0.1 wt % |
| Titanium dioxide fine particles | 6.0 wt % |

Comparative Example 1C

5. Process for Producing Transparent Ink Composition 2C

Into a 100 mL light-shielding sample bottle were weighed 73.0 g of N-vinylformamide, 17.5 g of tripropylene glycol diacrylate, and 7.5 g of glycerin EO-modified triacrylate, and then 1.0 g of Irgacure 184 and 1.0 g of Darocur were added thereto, followed by 2 hours of stirring with a magnetic stirrer to prepare transparent Ink Composition 2C. In this connection, Irgacure 184 has absorbance of 0.81 at 365 nm in an IPA solution (1 wt % concentration) but no absorption was observed in the region of 400 nm or longer.

| | |
|---|---|
| NVF | 73.0 wt % |
| TPGDA | 17.5 wt % |
| A-Gly-3E | 7.5 wt % |
| Irgacure 184 | 1.0 wt % |
| Darocur EHA | 1.0 wt % |

Comparative Example 2C

6. Process for Producing Transparent Ink Composition 3C

Into a 100 mL light-shielding sample bottle were weighed 73.0 g of N-vinylformamide, 17.5 g of tripropylene glycol diacrylate, and 7.5 g of glycerin EO-modified triacrylate, and then 1.0 g of Irgacure 134 and 0.95 g of Darocur were added thereto. After 30 minutes of stirring with a magnetic stirrer, 0.05 g of Kayalight OS was added thereto and the whole was further stirred for 2 hours to prepare transparent Ink Composition 3C.

| | |
|---|---|
| NVF | 73.0 wt % |
| TPGDA | 17.5 wt % |
| A-Gly-3E | 7.5 wt % |
| Irgacure 184 | 1.0 wt % |
| Darocur EHA | 0.95 wt % |
| Kayalight OS | 0.05 wt % |

Comparative Example 3C

7. Process for Producing Transparent Ink Composition 4C

Into a 100 mL light-shielding sample bottle were weighed 73.0 g of N-vinylformamide, 17.5 g of tripropylene glycol diacrylate, and 7.5 g of glycerin EO-modified triacrylate, and then 0.8 g of Irgacure 184, 0.8 g of Irgacure 369, and 1.0 g of Darocur were added thereto, followed by 2 hours of stirring with a magnetic stirrer to prepare transparent Ink Composition 4C.

| | |
|---|---|
| NVF | 73.0 wt % |
| TPGDA | 17.5 wt % |
| A-Gly-3E | 7.5 wt % |
| Irgacure 184 | 0.8 wt % |
| Irgacure 369 | 0.2 wt % |
| Darocur EHA | 1.0 wt % |

Comparative Example 4C

8. Process for Producing Cyan Ink Composition 2C

Cyan Ink Composition 2C having the following composition was prepared in the same manner as in the case of Cyan Ink Composition 1C of Example 2C except that the photopolymerization initiator was changed to Irgacure 184.

| | |
|---|---|
| NVF | 68.0 wt % |
| TPGDA | 17.5 wt % |
| A-Gly-3E | 7.5 wt % |
| Irgacure 184 | 3.0 wt % |
| Darocur EHA | 0.9 wt % |
| C. I. Pigment Blue 15:3 | 3.0 wt % |
| Kayalight OS | 0.1 wt % |

Comparative Example 5C

9. Process for Producing Cyan Ink Composition 3C

Cyan Ink Composition 3C having the following composition was prepared in the same manner as in the case of Cyan Ink Composition 1C of Example 2C except that the fluorescent whitening agent was eliminated and the amount of Darocur EHA was changed to 1.0 wt %.

| | |
|---|---|
| NVF | 68.0 wt % |
| TPGDA | 17.5 wt % |
| A-Gly-3E | 7.5 wt % |
| Irgacure 819 | 2.4 wt % |
| Irgacure 369 | 0.6 wt % |
| Darocur EHA | 1.0 wt % |
| C. I. Pigment Blue 15:3 | 3.0 wt % |

Comparative Example 6C

10. Process for Producing White Ink Composition 3C

White Ink Composition 3C having the following composition was prepared in the same manner as in the case of White Ink Composition 2C of Example AC except that the photopolymerization initiator was changed to Irgacure 184.

| | |
|---|---|
| NVF | 65.0 wt % |
| TPGDA | 17.5 wt % |
| A-Gly-3E | 7.5 wt % |
| Irgacure 184 | 3.0 wt % |
| Darocur EHA | 0.9 wt % |
| Hostalux KCB | 0.1 wt % |
| Titanium dioxide fine particles | 6.0 wt % |

Comparative Example 7C

11. Process for Producing White Ink Composition 4C

White Ink Composition 4C having the following composition was prepared in the same manner as in the case of White Ink Composition 2C of Example 4C except that the fluorescent whitening agent was eliminated and the amount of Darocur EHA was changed to 1.0 wt %.

| | |
|---|---|
| NVF | 65.0 wt % |
| TPGDA | 17.5 wt % |
| A-Gly-3E | 7.5 wt % |
| Irgacure 819 | 2.4 wt % |
| Irgacure 369 | 0.6 wt % |
| Darocur EHA | 1.0 wt % |
| Titanium dioxide fine particles | 6.0 wt % |

12. Curing Test 1C

Each of the above ink compositions was dropped on a glass substrate. Curing treatment was performed under conditions of ultraviolet irradiation intensity of 22 mW/cm$^2$ irradiation time of 3 seconds, and an integrated light intensity of 66 mJ/cm$^2$ using a combination of an ultraviolet LED (i-LED manufactured by Nichia Chemical Industries, Co., Ltd.) having a peak wavelength of 365 nm and an ultraviolet LED (manufactured by SANDER) having a wavelength range of 390 nm to 405 nm, and then the following visual evaluation and examination by touch for curability was carried out. The results are shown in Table 1C.

Evaluation Index:
A: No particular problem is observed and the composition is completely cured.
B: The composition is cured with ultraviolet irradiation but curing is insufficient.
C: The composition is cured only partially.
D: No curing is observed.

TABLE 1C

| | Curability evaluation |
|---|---|
| Example 1C | A |
| Comparative Example 1C | D |
| Comparative Example 2C | D |
| Comparative Example 3C | B |

13. Curing Test 2C

Each of the above ink compositions was dropped on a glass substrate. Curing treatment was performed under conditions of ultraviolet irradiation intensity of 22 mW/cm$^2$, irradiation time of 30 seconds, and an integrated light intensity of 660 mJ/cm$^2$ using a combination of an ultraviolet LED (i-LED manufactured by Nichia Chemical industries, Co., Ltd.) having a peak wavelength of 365 nm and an ultraviolet LED (manufactured by SANDER) having a wavelength range of 390 nm to 405 nm, and then the following visual evaluation and examination by touch for curability was carried out. The results are shown in Table 2C. The evaluation index is the same as in Curing Test 1C.

TABLE 2C

|  | Curability evaluation |
|---|---|
| Example 2C | A |
| Example 3C | A |
| Example 4C | A |
| Comparative Example 4C | D |
| Comparative Example 5C | B |
| Comparative Example 6C | D |
| Comparative Example 7C | C |

While the invention has been described in detail and with reference to specific embodiments thereof, it will be apparent to one skilled in the art chat various changes and modifications can be made therein without departing from the spirit and scope thereof.

This application is based on Japanese Patent Application Nos. 2004-370204 (filed Dec. 21, 2004), 2004-376503 (filed Dec. 27, 2004), 2005-094330 (filed Mar. 29, 2005), 2005-339142 (filed Nov. 24, 2005) and 2005-339143 (filed Nov. 24, 2005), the contents thereof being herein incorporated by reference.

What is claimed is:

1. An inkjet recording method comprising:
   ejecting an ultraviolet-curable ink composition for inkjet recording to a recording medium to attach the ejected ultraviolet-curable ink composition on the recording medium; and
   irradiating the attached ultraviolet-curable ink composition with a light emitted from an LED having a light-emission peak wavelength in the range of 350 to 420 nm, at an irradiation amount of 50 mJ/cm$^2$ to 6,000 mJ/cm$^2$, thereby curing the attached ultraviolet-curable ink composition,
   wherein the ultraviolet-curable ink composition for inkjet recording, comprises at least:
   a coloring material;
   a polymerizable compound comprising a monofunctional monomer, a bifunctional monomer and a polyfunctional monomer;
   a photo-polymerization initiator having an absorption wavelength in the range of 300 nm to 450 nm; and
   a fluorescent whitening agent having an absorption wavelength in the range of 200 nm to 400 nm and a light-emission wavelength in the range of 400 nm to 600 nm,
   wherein the photo-polymerization initiator has an absorption wavelength band that overlaps with a light-emission wavelength band of the fluorescent whitening agent,
   wherein the fluorescent whitening agent comprises a benzoxazole derivative, and
   wherein the photo-polymerization initiator is one or two or more compounds selected from bisacylphosphine oxides, monoacyiphosphine oxides and α-amino ketones and contained in an amount of 3 wt% to 15 wt% in the ultraviolet-curable ink composition.

2. The inkjet recording method according to claim 1, wherein the monofunctional monomer comprises at least one member selected from the group consisting of (2-methyl-2-ethyl-1,3-dioxolan-4-yl)methyl acrylate, (2-methyl-2-isobutyl-1,3-dioxolan-4-yl)methyl acrylate, phenoxyethyl acrylate, isobornyl acrylate, methoxydiethylene glycol monoacrylate, acryloylmorpholine, lauryl methacrylate, allyl glycol, 2-hydroxyethyl methacrylate, cyclohexyl methacrylate, and oxetane methacrylate.

3. The inkjet recording method according to claim 1, wherein the polyfunctional monomer comprises at least one member selected from the group consisting of trimethylolpropane triacrylate, trimethylolpropane trimethacrylate, trimethylolpropane EO-adducted triacrylate, trimethylolpropane PO-adducted triacrylate, glycerin EO-adducted triacrylate, glycerin EO-modified triacrylate, glycerin PO-adducted triacrylate, pentaerythritol triacrylate, dipentaerythritol hexaacrylate, (2,2,2-triacryloyloxymethyl)ethyl hydrogen phthalate, and dipentaerythritol polyacrylate.

* * * * *